(12) United States Patent
Beauvais et al.

(10) Patent No.: US 10,532,737 B2
(45) Date of Patent: Jan. 14, 2020

(54) COOPERATIVE PARK ASSIST

(71) Applicant: Ford Global Technologies, LLC, Dearborn, MI (US)

(72) Inventors: Brandon Beauvais, Dearborn, MI (US); Charles Everett Badger, II, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 55 days.

(21) Appl. No.: 15/597,260

(22) Filed: May 17, 2017

(65) Prior Publication Data

US 2018/0334163 A1 Nov. 22, 2018

(51) Int. Cl.
*B60W 30/06* (2006.01)

(52) U.S. Cl.
CPC ....... *B60W 30/06* (2013.01); *B60W 2550/408* (2013.01)

(58) Field of Classification Search
CPC ............ B60W 30/06; B60W 2550/408; G05D 1/0027
See application file for complete search history.

(56) References Cited

U.S. PATENT DOCUMENTS

| | | | |
|---|---|---|---|
| 7,498,954 B2 | 3/2009 | Boss et al. | |
| 9,111,450 B2 | 8/2015 | Stefan et al. | |
| 9,298,186 B2 | 3/2016 | Harvey | |
| 9,443,430 B2 | 9/2016 | Beaurepaire | |
| 9,449,512 B2 | 9/2016 | Zafiroglu et al. | |
| 9,639,994 B2 | 5/2017 | Beaurepaire | |
| 2015/0039173 A1* | 2/2015 | Beaurepaire | B60W 30/06 701/23 |
| 2015/0039213 A1 | 2/2015 | Stefan et al. | |
| 2015/0279210 A1 | 10/2015 | Zafiroglu et al. | |
| 2016/0117927 A1* | 4/2016 | Stefan | B60W 30/06 340/932.2 |
| 2016/0313731 A1 | 10/2016 | Leppanen et al. | |
| 2018/0053421 A1* | 2/2018 | Ohl | B60W 30/06 |
| 2018/0082588 A1* | 3/2018 | Hoffman, Jr. | G08G 1/166 |
| 2018/0297588 A1* | 10/2018 | Cheaz | B60W 30/06 |

FOREIGN PATENT DOCUMENTS

| | | |
|---|---|---|
| DE | 102009057647 A1 | 6/2011 |
| DE | 10212215218 A1 | 6/2014 |
| DE | 102016208991 A1 | 11/2017 |
| EP | 288640 A1 | 6/2015 |
| JP | 2009220614 A | 10/2009 |

OTHER PUBLICATIONS

GB Search Report dated Oct. 26, 2018 re GB Appl. No. 1807903.8.

\* cited by examiner

*Primary Examiner* — Michael D Lang
(74) *Attorney, Agent, or Firm* — Frank A. MacKenzie; Bejin Bieneman PLC

(57) ABSTRACT

The vehicle system includes a position sensor programmed to output a distance signal representing a distance of a primary parked vehicle to a boundary. The vehicle system further includes a processor programmed to receive a parking request and determine a moving distance that is based at least in part on the distance to the boundary and an amount of space the primary parked vehicle requires to exit a parking space.

14 Claims, 6 Drawing Sheets

COOPERATIVE PARK ASSIST

BACKGROUND

Automobile vehicles with a parking assist system offer assistance to a driver when parallel parking. The parking assist system can identify a suitable parking space, i.e., determine if the length of the parking spot is appropriate for parallel parking, and can steer the vehicle into the parking space with little input from the driver.

DETAILED DESCRIPTION

Figure 1:
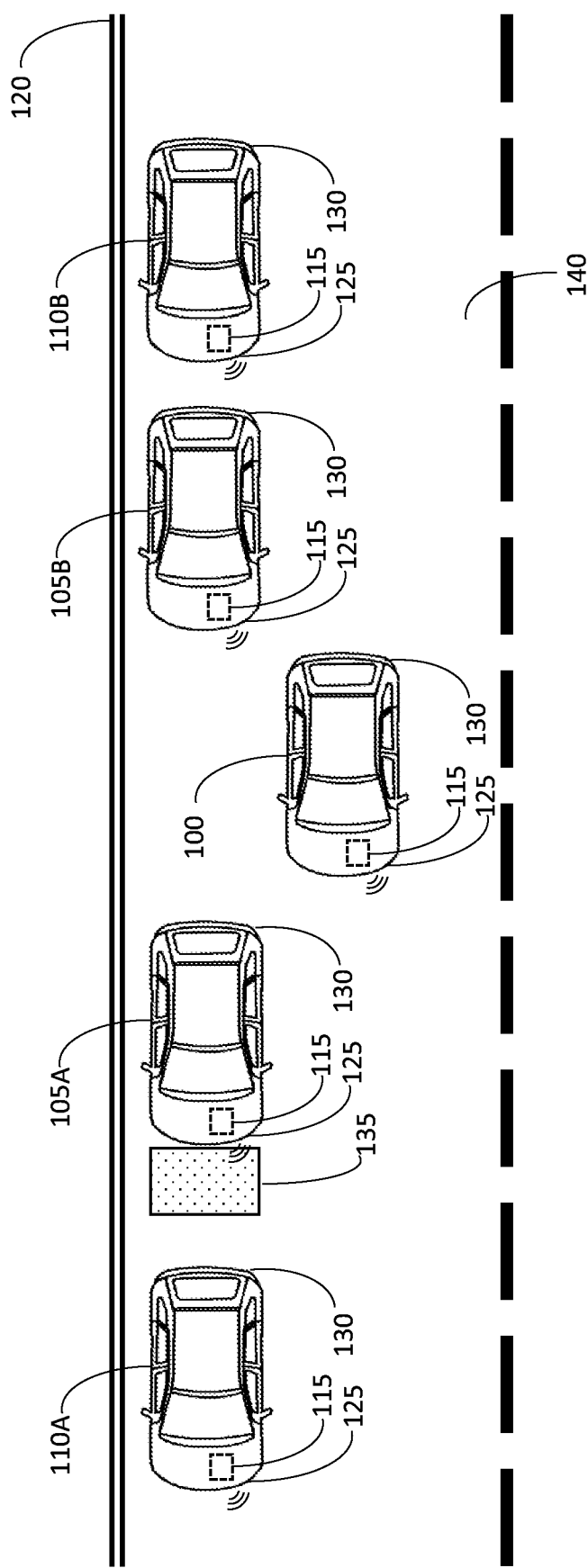
FIG. 1 illustrates an example parking vehicle alongside parked vehicles in a parallel arrangement, any of which could have a cooperative park assist system.

Parking space is at a premium, especially in urban environments, and often is the case that potential parallel parking locations go unused because the space is too small to perform a parallel parking maneuver. A driver or, e.g., a vehicle equipped with a parking assist system, attempting to parallel park will move on to the next parking opportunity when the driver determines that the space under consideration is inadequate. There may be space in front or behind parked vehicles adjacent to a parking vehicle that could be used if, for example, drivers of the parked vehicles were still available and willing to move their vehicles. However, in most circumstances this is not the case. The potentially useful space in front of or behind the parked vehicles goes to waste.

One solution that may increase available parking space includes incorporating cooperative park assist system into a parked vehicle. The cooperative park assist system includes a position sensor programmed to output a distance signal representing a distance of a primary parked vehicle to a boundary. The cooperative park assist system further includes a processor programmed to receive a parking request from a parking vehicle and determine a moving distance that is based at least in part on the distance to the boundary and an amount of space the parked vehicle requires to exit a parking space.

The processor may be programmed to compare the moving distance to a predetermined threshold. The processor may be programmed to determine that the moving distance is equal to or greater than the predetermined threshold and ignore the parking request after determining that the moving distance is equal to or greater than the predetermined threshold. The processor may be programmed to determine that the moving distance is less than the predetermined threshold and command a vehicle controller of the primary parked vehicle to move the moving distance after determining that the moving distance is less than the predetermined threshold.

The processor may be programmed to command a communication interface to query at least one secondary parked vehicle for a supplemental distance of the at least one secondary parked vehicle. The processor may be programmed to calculate an aggregate distance based on the moving distance and the supplemental distance. Further, the processor may be programmed to compare the aggregate distance to a predetermined threshold, determine that the aggregate distance is less than the predetermined threshold, and command the at least one secondary parked vehicle to move the supplemental distance after determining that the aggregate distance is less than the predetermined threshold.

In some possible approaches, the processor may be programmed to receive an occupant detected signal output by an occupant detection system indicating an occupant in or near the primary parked vehicle. In this instance, the processor may be programmed to ignore the parking request after receiving the occupant detected signal output by the occupant detection system.

An example method includes receiving a parking request from a parking vehicle, receiving a distance signal representing a distance of a primary parked vehicle to a boundary, and determining a moving distance based at least in part on the distance to the boundary and an amount of space for the primary parked vehicle to exit a parking space.

The method may further include comparing the moving distance to a predetermined threshold, determining that the moving distance is equal to or greater than the predetermined threshold, and ignoring the parking request after determining that the moving distance is equal to or greater than the predetermined threshold. In some implementations, the method may include determining that the moving distance is less than the predetermined threshold and commanding the primary parked vehicle to move the moving distance after determining that the moving distance is less than the predetermined threshold.

The method may further include querying at least one secondary parked vehicle for a supplemental distance of the at least one secondary parked vehicle, calculating an aggregate distance based on the moving distance and the supplemental distance, comparing the aggregate distance to a predetermined threshold, determining that the aggregate distance is less than the predetermined threshold, and commanding the at least one secondary parked vehicle to move the supplemental distance after determining that the aggregate distance is less than the predetermined threshold.

In some possible approaches, the method includes detecting an occupant in or near the primary parked vehicle based at least in part on a signal output by an occupant detection system and ignoring the parking request after detecting the occupant in or near the parked vehicle.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIG. 1, a parking vehicle 100, primary parked vehicles 105A, 105B parked closest to the parking vehicle 100 (collectively referred to as "primary parked vehicles 105"), and neighboring secondary parked vehicles 110A, 110B closer to the parked vehicles 105 than the parking vehicle 100 (collectively referred to as "secondary parked vehicles 110") include a cooperative park assist system 115. A vehicle with the cooperative park assist system 115 may be referred to as the "host" vehicle. Thus, the host vehicle 100, 105, 110 may be a parking vehicle 100 or a parked vehicle 105, 110. The term "parked vehicles" generally refers to both the primary and secondary parked vehicles 105, 110 unless stated otherwise. The primary parked vehicle 105A is the parked vehicle 105 closest to a front bumper 125 of the parking vehicle 100. Similarly, the primary parked vehicle 105B is the parked vehicle 105 closest to a rear bumper 130 of the parking vehicle 100. The secondary parked vehicles 110A are the secondary parked vehicles 110 in front of the primary parked vehicle 105A, and the secondary parked vehicles 110B are the secondary parked vehicles 110 in back of the primary parked vehicle 105B. The primary parked vehicles 105 and the secondary parked vehicles 110 are parked on a street 140 in a parallel arrangement along a curb 120. The parking vehicle 100 and the parked vehicles 105, 110 may be any passenger or commercial automobile such as a car, a truck, a sport utility vehicle, a crossover vehicle, a van, a minivan, a taxi, a bus, etc.

The cooperative park assist system 115 when incorporated in the parking vehicle 100 and at least one parked vehicle 105, 110 can establish communication between the parking vehicle 100 and the parked vehicle 105, 110. Moreover, the cooperative park assist system 115 may establish communication between the parking vehicle 100 and the parked vehicle 105, 110 even if the parked vehicle 105, 110 is inactive (e.g., the ignition of the parked vehicle 105, 110 is in an off position or the parked vehicle 105, 110 is otherwise not in an operational mode) and the parking vehicle 100 is active (e.g., the ignition of the parking vehicle 100 is in an on position or the parking vehicle 100 is otherwise in an operational mode). The cooperative park assist system 115 identifies which vehicle is the parking vehicle 100 and which vehicle is the parked vehicle 105, 110. The cooperative park assist system 115 in the parking vehicle 100 can request the parked vehicle 105, 110 to free up additional parking space. Additionally, the cooperative park assist system 115 in the parked vehicle 105 can determine a moving distance 135, which is a distance the parked vehicle 105 can move while keeping enough space for the parked vehicle 105 to exit its own parking space, and command the parked vehicle 105 to move the moving distance 135. In other words, the cooperative park assist system 115 can be configured to perform either function. The amount of space needed to exit the parking space may be a predetermined value specific to each parked vehicle 105. The amount of space needed to exit the parking space may be based on factors such as, e.g., the size or class of the parked vehicle 105, the turning radius of the parked vehicle 105, driver preference, or possibly other factors.

The cooperative park assist system 115 may be engaged directly by a driver who visually recognizes that a parallel parking space is insufficient, or by a system installed on the parking vehicle 100, e.g., a parking assist system, that can automatically determine that a parking space lacks the length to perform a parallel parking maneuver. However engaged, the cooperative park assist system 115 of the parking vehicle 100 can receive the moving distance 135 from the cooperative park assist system 115 of the parked vehicle 105. The cooperative park assist system 115 may respond by commanding the parked vehicle 105 to move the moving distance 135. Further, in some instances, the cooperative park assist system 115 may respond by coordinating a move of the parked vehicles 105, 110. Yet further, the cooperative park assist system 115 may respond by ignoring the request.

For example, in some situations, the moving distance 135 determined by one of the primary parked vehicles 105 may accommodate a parking request of the parking vehicle 100, and the cooperative park assist system 115 of the primary parked vehicle 105 may be requested to command the primary parked vehicle 105 to move the moving distance 135. In other situations, even more space may be required to fulfill the parking request, and in this case the cooperative park assist system 115 of the primary parked vehicle 105 may query at least one secondary parked vehicle 110 for a supplemental distance 195 the secondary parked vehicle 110 can move. Similar to the moving distance 135, the supplemental distance 195 is a distance the secondary parked vehicle 110 can move. The secondary parked vehicle 110 may reserve enough space for the secondary parked vehicle 110 to exit its own parking space. The cooperative park assist system 115 of the primary parked vehicle 105 may determine an aggregate distance based on the moving distance 135 and the supplemental distance 195. As set forth below, the aggregate distance may be, e.g., the sum of the moving distance 135 of the primary parked vehicle 105 and any supplemental distances 195 received from any secondary parked vehicles 110. If the aggregate distance offers enough space for the parking vehicle 100 to perform a parallel parking maneuver, the cooperative park assist system 115 of the primary parked vehicle 105 may coordinate the movements of the primary parked vehicles 105 and any secondary parked vehicles 110 to free up the space required by the parking vehicle 100.

The cooperative park assist system 115 may be further programmed to provide a distance measurement from the host vehicle 105, 110 to a boundary 190, e.g., an obstacle, a line marking the boundary of a parking space, etc. When incorporated into the host vehicle 105, 110, which may be one of the parked vehicles 105, 110, the cooperative park assist system 115 may be programmed to determine the moving distance 135, which is the distance the host vehicle 105 can move, and the supplemental distance 195, which is the distance the other parked vehicles 110 can move. Both the moving distance 135 and the supplemental distance 195 are based at least in part on the distance measurement of each parked vehicle 105, 110 and an amount of space available for the host vehicle 105, 110 to exit its own parking space. Further, in some instances, the cooperative park assist system 115 may be programmed to ignore the parking request from the parking vehicle 100. The cooperative park assist system 115 may ignore the parking request if, e.g., there is not enough space to accommodate a parking request, the host vehicle 105, 110 was previously moved and moving the host vehicle 105, 110 again would inconvenience the owner of the host vehicle 105, 110, one or more pedestrians are near the parked vehicles 105, 110, an occupant is in the host vehicle 105, 110, etc. The total distance the host vehicle 105, 110 can move during a particular key-off cycle may be defined by a predetermined threshold. This may permit multiple moves of the host vehicle 105, 110 without inconveniencing the driver. For example, if the predetermined threshold is set to, e.g., ten meters, and the parked vehicle 105, 110 was previously moved nine meters during the same key-off cycle, the cooperative park assist system 115 may be programmed to ignore a request to move more than one meter, at least until the next key-off cycle. In other instances, the cooperative park assist system 115 may ignore the parking request altogether if the occupant is detected in or near one or more of the parked vehicles 105, 110.

Figure 2:
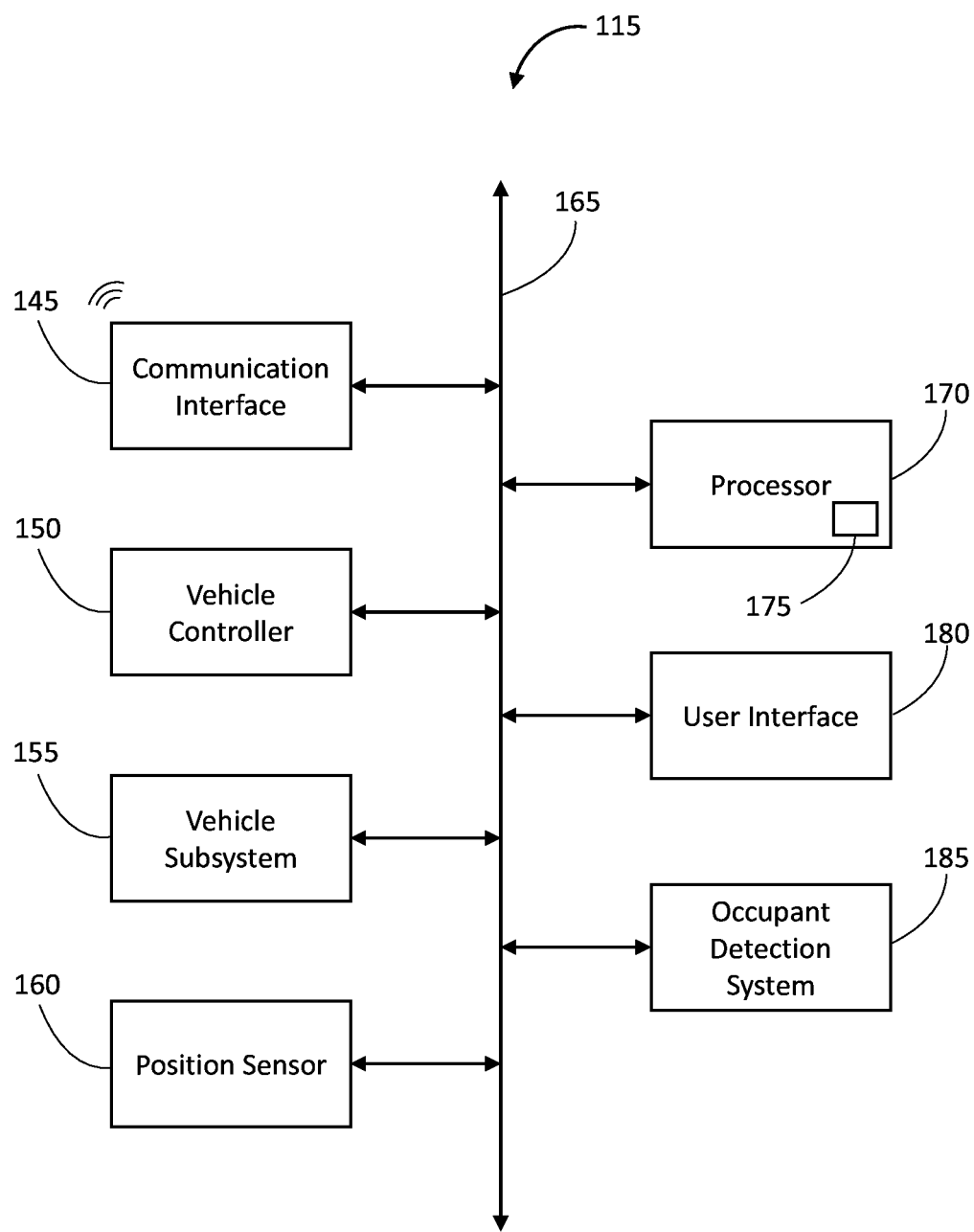
FIG. 2 is a block diagram illustrating example components of the cooperative park assist system.

FIG. 2 is a block diagram illustrating example components of the cooperative park assist system 115 incorporated into the parking vehicle 100, one of the parked vehicles 105, 110, or both. The cooperative park assist system 115 includes, or works in coordination with, a communication interface 145, a user interface 180, a vehicle controller 150 controlling a vehicle subsystem 155, a position sensor 160, an occupant detection system 185, and a processor 170. The components of the cooperative park assist system 115 are in communication with one another via, e.g., a communication bus 165. The communication bus 165 may be, e.g., a wired or wireless communication link such as a controller area network (CAN) bus, Ethernet, Bluetooth®, Bluetooth® Low Energy, or the like.

The communication interface 145 is implemented via an antenna, circuits, chips, or other electronic components that can facilitate wireless communication with other vehicles, including the parking vehicle 100, the parked vehicles 105, 110, or both. Regardless of whether the cooperative park assist system 115 is incorporated into the parking vehicle 100 or the parked vehicle 105, 110, the communication interface 145 may facilitate a communication pairing between the host vehicle 105, 110 and the parking vehicle 100, at least one of the parked vehicles 105, 110, or a combination of both. The communication interface 145 may be programmed to communicate in accordance with any number of wireless communication protocols, including a vehicle-to-vehicle communication protocol, a vehicle-to-infrastructure communication protocol, Bluetooth®, Bluetooth® Low Energy, Wifi, etc. An example of a vehicle-to-vehicle or vehicle-to-infrastructure communication protocol includes the Dedicated Short Range Communication (DSRC) protocol. The communication interface 145 may be programmed to receive messages from other vehicles, which may include the parking vehicle 100 or any parked vehicles 105, 110. Messages received by the parking vehicle 100 or the parked vehicles 105, 110 may be transmitted to the processor 170 over the intra-vehicle communication bus 165 for processing, stored in a memory 175, or both. Further, the communication interface 145 may be programmed to transmit messages to the parking vehicle 100 or one or more parked vehicles 105, 110 in accordance with commands received from the processor 170 via the intra-vehicle communication bus 165. Moreover, the communication interface 145 may receive signals from infrastructure devices. The signals received from the infrastructure devices may indicate, e.g., the state of a traffic control device, etc.

The user interface 180 is implemented via circuits, chips, or other electronic components that can receive user inputs from inside the host vehicle 100, 105, 110, such as the parking vehicle 100 or one of the parked vehicles 105, 110, and present information, such as alerts or information associated with the cooperative park assist system 115, inside the host vehicle 100, 105, 110. In some possible implementations, the user interface 180 is a touch-sensitive display screen, and user inputs may be received by virtual buttons presented on the touch-sensitive display screen. For example, the driver preparing to parallel park, i.e., the driver of the parking vehicle 100, may engage the cooperative park assist system 115 via a virtual button on the user interface 180. User inputs may also or alternatively be received via hard buttons located in the passenger compartment of the host vehicle 100, 105, 110, and the driver may engage the cooperative park assist system 115 of the parking vehicle 100 by pressing the hard button. The user interface 180 may present information to the driver in the form of alerts that may include audible alerts, visual alerts, haptic alerts, etc. Additionally, or in the alternative, the user interface 180 may present information to the driver via a display screen, such as the status of the parking request, a parking request rejected message, a commanded move by the parked vehicle 105, 110, etc. In some instances, the driver may disengage the cooperative park assist system 115 by providing a user input to the user interface 180 at any time so that the host vehicle 105, 110 may not be moved by the parking vehicle 100, e.g., when parked in an assigned parking space. In other instances, the cooperative park assist system 115 may automatically be disabled when, for example, the driver paid for the parking spot, etc. In other words, the cooperative park assist system 115 may be disengaged automatically (i.e., without receiving a user input).

The occupant detection system 185 is implemented via sensors, circuits, chips, or other electronic components that can detect and identify an occupant in or near the host vehicle 100, 105, 110. In one possible approach, the occupant detection system 185 may include a remote keyless entry device, e.g., a fob, carried by the driver, and the occupant detection system 185 may wirelessly communicate and identify the remote keyless entry device when it is near, i.e., within communication range of, the host vehicle 100, 105, 110. Other possible options that may assist in identifying occupant presence in or near the host vehicle 100, 105, 110 may include the occupant detection system 185 identifying, e.g., the seat belt fastened, the door ajar, the ignition of the parking vehicle 100 is in an on position or otherwise in an operational mode, etc. Regardless of how the occupant is identified, the occupant detection system 185 may output an occupant detected signal representing that an occupant is in or near the host vehicle 100, 105, 110. The occupant detected signal may be output to the processor 170, the memory 175, or both, via the communication bus 165.

The position sensor 160 is implemented via sensors, circuits, chips, or other electronic components that can measure distances from the host vehicle 105, 110 to a boundary 190. The boundary 190 may be, for example, physical boundaries, such as another vehicle, a curb, etc., or legal boundaries, such as lines marking a parking space, an area near a fire hydrant, an area near a driveway, an area too close to an intersection, an area near a stop sign or other traffic control signs, etc. Thus, the boundary 190 may refer to any obstacles that would prevent a parking space from being occupied. The position sensor 160 may be one or more sensors, e.g., an ultrasonic sensor, camera, RADAR, LIDAR, etc., and the position sensor 160 may be used by other vehicle subsystems requiring distance measurements, such as collision avoidance subsystems, navigation and guidance subsystems, automatic braking subsystems, etc. The position sensor 160 may be programmed to determine a distance from a point on the host vehicle 105, 110 to a boundary 190, and output a distance signal, representing the distance, to the processor 170 of the host vehicle 105, 110 via the communication bus 165. For example, the position sensor 160 may measure the distance from a front bumper 125 of the parked vehicle 105, 110 to a rear bumper 130 of the secondary parked vehicle 110 immediately in front of the parked vehicle 105, 110.

The memory 175 is implemented via circuits, chips, or other electronic components that can electronically store data, including instructions executable by the processor 170 to control one or more of the cooperative park assist system 115 operations. The memory 175 may refer to read only memory (ROM), random-access memory (RAM), or the like. The processor 170 may store data in the memory 175 that may be read by the processor 170 at a later time for use by the cooperative park assist system 115.

The processor 170 is implemented via memory, circuits, chips, or other electronic components programmed to carry out computer-executable instructions associated with operation of the cooperative park assist system 115. Whether incorporated into the parking vehicle 100, the primary parked vehicle 105, or the secondary parked vehicle 110, the processor 170 is programmed to establish communication between any combination of the parking vehicle 100, the primary parked vehicle 105, and the secondary parked vehicle 110, by, e.g., commanding the communication interface 145 of one to pair with the communication interface 145 of another. The processor 170 may be further programmed to identify the host vehicle 100, 105, 110 as either the parking vehicle 100, a primary parked vehicle 105, or a secondary parked vehicle 110. The processor 170 may be further programmed to identify each paired vehicle as the parking vehicle 100, a primary parked vehicle 105, or a secondary parked vehicle 110. In general, only one vehicle is identified as the parking vehicle 100, and only the primary parked vehicle 105 communicates with the parking vehicle 100. Thus, if the processor 170 determines that the host vehicle 100, 105, 110 is the parking vehicle 100, the processor 170 may determine that the paired vehicle is a primary parked vehicle 105. If the processor 170 determines that the host vehicle 100, 105, 110 is a primary parked vehicle 105, the processor 170 may determine that the paired vehicle is the parking vehicle 100 if the other vehicle transmitted a parking request or that the paired vehicle is a parking vehicle 100, another primary parked vehicle 105, or a secondary parked vehicle 110. If the processor 170 determines that the host vehicle 100, 105, 110 is a secondary parked vehicle 110, it may determine that the paired vehicle is the primary parked vehicle 105 or another secondary parked vehicle 110. Such determinations may be based on messages communicated between the vehicles (e.g., the parking vehicle 100 and primary parked vehicles 105 may identify themselves in messages transmitted to the secondary parked vehicles 110) or location information (e.g., the host vehicle 100, 105, 110 may determine whether a paired vehicle is the parking vehicle 100, a primary parked vehicle 105, or a secondary parked vehicle 110 based on the location of the paired vehicle relative to the host vehicle 100, 105, 110). The processor 170 may further distinguish the paired vehicle according to identification signals (e.g., signals including the vehicle identification number or another unique identifier of the vehicle) received from the respective paired vehicles via the communication interface 145.

Further, in some possible implementations, the processor 170 of the parking vehicle 100 may receive minimum parking distance data representing the amount of additional parking space required to parallel park from components located on the parking vehicle 100, e.g., the parking assist system, or the like. When the cooperative park assist system 115 is engaged via the user interface 180 on the parking vehicle 100, the processor 170 of the parking vehicle 100, once paired with one or more primary parked vehicles 105, may be programmed to transmit the parking request to one or both of the primary parked vehicles 105. Alternatively, the processor 170 of the parking vehicle 100 may not pair with any parked vehicle 105 if, e.g., the cooperative park assist system 115 is not installed in one or more parked vehicles 105. In this case, the processor 170 of the parking vehicle 100 may be programmed to command the communication bus 165 to transmit a message to the user interface 180 indicating that the parking request is rejected after an appropriate time-out period, e.g., on the order of 1-5 seconds, after sending the parking request.

The processor 170 of the host vehicle 105, 110 may be programmed to send, over the communication bus 165, a command for the position sensor 160 to measure the distance to one or more boundaries 190, which could include a boundary 190 ahead of the host vehicle 105, 110 and a boundary 190 behind the host vehicle 105, 110. Upon receiving the command from the processor, the position sensor 160 may be configured or programmed to determine the distance of the host vehicle 105, 110 to the boundary 190 and output the distance signal to the processor 170 of the host vehicle 105, 110 via the communication bus 165. If the position sensor 160 is in an inactive state, e.g., a low-power or off mode, the command from the host vehicle 105, 110 may wake the position sensor 160, e.g., by a wake-up circuit, in order to perform the distance measurement.

In addition, or in the alternative, before the position sensor 160 enters the inactive state, e.g., as the host vehicle 100, 105, 110 is parking, the processor 170 of the host vehicle 100, 105, 110 may be programmed to command the position sensor 160 to measure the distance before receiving a parking request. In this instance, the processor 170 of the host vehicle 100, 105, 110 may be programmed to store the resulting distance signal from the position sensor 160 in the memory 175. Thereafter, if the host vehicle 105, 110 receives a parking request from the parking vehicle 100, the processor 170 of the host vehicle 105, 110 may be programmed to determine that the position sensor 160 is in the inactive state and process the parking request according to the stored distance measurement. By using the stored distance measurement, the position sensor 160 can stay in the inactive state to conserve energy.

When the host vehicle 100, 105, 110 is the primary parked vehicle 105, the processor 170 may be programmed to determine the moving distance 135. The moving distance 135, as set forth above, is the amount of distance the primary parked vehicle 105 may move in order to make space available to the parking vehicle 100 for a parallel parking maneuver. The moving distance 135 may be based on the distance signal, i.e. the distance from the primary parked vehicle 105 to the boundary 190, and the amount of space the primary parked vehicle 105 needs to exit its own parking space. The processor 170 of the primary parked vehicle 105 may consider other factors into the moving distance 135 calculation, e.g., signals received from the infrastructure devices, distance signals stored in the memory 175 from a previous distance measurement, etc. The processor 170 of the primary parked vehicle 105 may be programmed to transmit the moving distance 135 to the processor 170 of the parking vehicle 100 via the communication interface 145. Alternatively, the processor 170 of one of the primary parked vehicles 105 may be programmed to receive the moving distance 135 from the other primary parked vehicle 105. In this case, the processor 170 of the one primary parked vehicle 105 may be programmed to transmit both moving distances 135 or a summation of the moving distances 135 to the processor 170 of the parking vehicle 100 via the communication interface 145.

The processor 170 of the parking vehicle 100 may be programmed to receive the moving distance 135 from one or both of the primary parked vehicles 105. For instance, the processor 170 of the parking vehicle 100 may be programmed to compare the moving distances 135 or the summation of the moving distances 135 to the minimum parking distance data to determine whether the moving distances 135 from the primary parked vehicles 105 taken together or separately are equal to or greater than the minimum parking distance data. If the processor 170 of the parking vehicle 100 determines that the moving distances 135 taken together or separately are equal to or greater than the minimum parking distance data, the processor 170 of the parking vehicle 100 may be programmed to command the communication interface 145 to transmit a message to one or both of the primary parked vehicles 105 indicating that one or both of the primary parked vehicles 105 move their respective moving distance 135 or a distance less than their respective moving distances 135 (referred to as the "commanded moving distance"). In the case where the processor 170 of the parking vehicle 100 transmits the message to only one of the primary parked vehicles 105, the processor 170 of one primary parked vehicle 105 may be programmed to transmit a message to the other primary parked vehicle 105 commanding the other primary parked vehicle 105 to move its commanded moving distance. In other instances, the processor 170 of the parking vehicle 100 may determine that the moving distances 135 taken together or separately are less than the minimum parking distance data. In this case, the primary parked vehicles 105 are unable to accommodate the required distance for a parallel parking maneuver. In keeping with this case, the processor 170 of the parking vehicle 100 may be programmed to command the communication interface 145 to transmit a message to the primary parked vehicles 105 indicating that the primary parked vehicles 105 query at least one secondary parked vehicle 110 for its respective supplemental distance 195, as set forth further below. The processor 170 of the parking vehicle 100 may be programmed to calculate and include in the message a secondary distance value the secondary parked vehicles 110 need to move to accommodate the parallel parking maneuver. The processor 170 of the parking vehicle 100 may calculate the secondary distance value by, e.g., subtracting the amount of space the parking vehicle 100 needs to execute the parallel parking maneuver from the moving distance 135 received from the communication interface 145 of the primary parked vehicle 105.

The processor 170 of the parked vehicle 105, 110, including primary parked vehicles 105 and secondary parked vehicles 110, may programmed to compare the commanded moving distance to a predetermined threshold after receiving the message to move the commanded moving distance from the parking vehicle 100. The predetermined threshold may define limits on how far the parked vehicle 105, 110 may be allowed to move during an ignition key-off cycle. When the host vehicle 100, 105, 110 is a primary parked vehicle 105 or secondary parked vehicle 110, the processor 170 may be programmed to compare the commanded moving distance to the predetermined threshold to, e.g., determine whether the host vehicle 105 can move the commanded moving distance. The predetermined threshold may be a value stored in the memory 175 of the host vehicle 100, 105, 110 that represents a maximum distance threshold, and the processor 170 of the parked vehicle 105, 110 may be programmed to read the predetermined threshold from the memory 175. The predetermined threshold may be, e.g., a constant distance value that any commanded moving distance may not exceed, a distance value representing a percentage of the commanded moving distance, a maximum distance value that the summation of commanded moving distances from multiple parking requests during an ignition key-off cycle may not exceed, etc. The predetermined threshold may also or alternatively identify a maximum number of times the host vehicle 105, 110 may move during an ignition key-off cycle.

The processor 170 of the primary parked vehicle 105 is programmed to determine that the commanded moving distance is equal to or greater than the predetermined threshold and ignore the parking request. Ignoring the parking request may include ignoring the message to move the commanded moving distance. In instances where the processor 170 of the primary parked vehicle 105 determines that the commanded moving distance is equal to or greater than the predetermined threshold, the processor 170 of the primary parked vehicle 105 may be programmed to command the communication interface 145 to transmit a message to the parking vehicle 100 or another parked vehicle 105, 110 indicating the host vehicle 105, 110 has ignored the parking request. The processor 170 of the parking vehicle 100 may be programmed to output the parking request rejected message to the user interface 180 via the communication bus 165 upon receiving such a message. That way, an occupant of the parking vehicle 100 can find a different parking spot.

Further, the processor 170 of the primary parked vehicle 105 may be programmed to determine that the commanded moving distance is less than the predetermined threshold. In such instances, the processor 170 of the primary parked vehicle 105 may command the host vehicle 105 to move the commanded moving distance. In this case, commanding the host vehicle 105 to move the commanded moving distance may include the processor 170 of the primary parked vehicle 105 outputting, via the communication bus 165, control signals to a vehicle controller 150, such as an autonomous mode controller, that control one or more vehicle subsystems 155 of the host vehicle 105. For example, the control signals may be output to the vehicle controller 150 associated with the powertrain and the power steering subsystems, and the control signals may engage the appropriate subsystem in such a way as to allow the primary parked vehicle 105 to move the commanded moving distance. That is, the vehicle controller 150 may output control signals to various actuators that can manipulate the steering, braking, and acceleration of the host vehicle 105 in accordance with the control signals received.

As set forth above, the parked vehicles 105, 110 may be unable to accommodate the required distance for a parallel parking maneuver by the parking vehicle 100. Thus, the processor 170 of the primary parked vehicle 105 may be programmed to receive a message from the parking vehicle 100 requesting that the primary parked vehicle 105 queries at least one secondary parked vehicle 110 for its respective supplemental distance 195. The message may include the secondary distance value the secondary parked vehicles 110 need to move to accommodate the parallel parking maneuver. In some instances, the processor 170 of the primary parked vehicle 105 commands the communication interface 145 to pair with the communication interface 145 of one or more secondary parked vehicles 110, including the closest secondary parked vehicle 110. After pairing with the secondary parked vehicle 110, the processor 170 of the primary parked vehicle 105 may be programmed to query the secondary parked vehicle 110 for its supplemental distance 195. The processor 170 of the primary parked vehicle 105 may determine which secondary parked vehicle 110 it is paired with based on, e.g., the secondary parked vehicles 110 identifying themselves in the messages transmitted, the location of the paired vehicle relative to the host vehicle 100, 105, 110, the unique identifiers of the vehicles, etc., as set forth above. In response to the query, the processor 170 of the secondary parked vehicle 110 may be programmed to determine its supplemental distance 195 by, e.g., measuring the supplemental distance 195 or retrieving the stored supplemental distance 195 from the memory 175 of the secondary parked vehicle 110, and transmit the supplemental distance 195 to the processor 170 of any paired parked vehicle 105, 110 via the communication interface 145.

The processor 170 of the primary parked vehicle 105 may be programmed to receive the supplemental distance 195 from the processor 170 of any secondary parked vehicle 110. In some instances, the processor 170 of the primary parked vehicle 105 may use a daisy chain approach in which the processor 170 of the primary parked vehicle 105 may be programmed to query the closest secondary parked vehicle 110 in the arrangement of secondary parked vehicles 110 parked along the curb 120. If a pairing occurs, the closest secondary parked vehicle 110 transmits its supplemental distance 195. In keeping with the daisy chain approach, the processor 170 of the primary parked vehicle 105 may be programmed to transmit a message to the closest secondary parked vehicle 110 requesting that the closest secondary parked vehicle 110 query the next closest secondary parked vehicle 110 for its supplemental distance 195. Every supplemental distance 195 received may be stored in the memory 175 of the primary parked vehicle 105. This daisy chain querying may continue until the processor 170 of the primary parked vehicle 105 determines that the sum of the supplemental distances 195 is equal to or greater than the secondary distance value needed to accommodate the parallel parking maneuver, or number of secondary parked vehicles 110 are exhausted. In other instances, the processor 170 of the primary parked vehicle 105 may be programmed to query any parked vehicle 105, 110 for its supplemental distance 195 regardless of the relative position of the parked vehicle 105, 110. In this case, the queries can continue until the processor 170 of the primary parked vehicle 105 determines that the sum of the supplemental distances 195 is equal to or greater than the secondary distance value needed to accommodate the parallel parking maneuver, or the number of secondary parked vehicles 110 are exhausted. The primary parked vehicle 105 may be programmed to limit the number of queries by comparing each successive query with, e.g., a maximum query value stored in the memory 175 of the primary parked vehicle 105, and terminate the queries when the maximum query value is reached. In addition, when asked to provide its supplemental distance 195, a secondary parked vehicle 110 may determine that the boundary 190 is, e.g., a fire hydrant, a curb, an intersection, etc., and the secondary parked vehicle 110 may block this boundary 190 if it were to move. In this case, the processor 170 of the secondary parked vehicle 110 may be programmed to decline the request for its supplemental distance 195 and command the communication interface 145 to transmit a message to the primary parked vehicle 105 or parked vehicle 105, 110 that sent the request indicating that it cannot accommodate any requests to move. In response to the message, the processor 170 of the primary parked vehicle 105 may discontinue the queries.

The processor 170 of one or both primary parked vehicles 105 may be programmed to calculate the aggregate distance, which is the sum of the moving distance 135 of the primary parked vehicle 105 and any supplemental distances 195 received from any secondary parked vehicles 110, as set forth above. For example, the primary parked vehicle 105A may calculate the aggregate distance of the parked vehicles 110A ahead of the primary parked vehicle 105A. Similarly, the primary parked vehicle 105B may calculate the aggregate distance of the parked vehicles 110B behind the primary parked vehicle 105B. The processors 170 of one or both of the primary parked vehicles 105A, 105B may transmit their respective aggregate distances to the processor 170 of the parking vehicle 100 via the communication interface 145.

The processor 170 of the parking vehicle 100 may be programmed to receive the aggregate distances from one or both of the primary parked vehicles 105 and compare the aggregate distances to the minimum parking distance data. If the processor 170 of the parking vehicle 100 determines that the aggregate distances are less than the minimum parking distance data, the parked vehicles 105, 110 are not able to accommodate the parallel parking maneuver. In this case, the processor 170 of the parking vehicle 100 may be programmed to output the parking request rejected message to the user interface 180 via the communication bus 165. In other instances, the processor 170 of the parking vehicle 100 may be programmed to command the communication interface 145 to transmit a message to one or both of the primary parked vehicles 105 commanding the parked vehicles 105, 110, including the primary parked vehicles 105 and the secondary parked vehicles 110, to move their respective portion of aggregate distance or a distance less than their respective portion of the aggregate distance (referred to as the "commanded aggregated distance") if the processor 170 of the parking vehicle 100 determines that the aggregate distances taken together or separately are equal to or greater than the minimum parking distance data. The respective portion of the aggregate distance may refer to the respective moving distances 135 of the primary parked vehicles 105 and the respective supplemental distances 195 of the secondary parked vehicles 110.

Alternatively, the primary parked vehicles 105 may be programmed to compare the aggregate distances directly to the minimum parking distance data. In this case, the processors 170 of one or both of the primary parked vehicles 105 may be programmed to transmit a message, via the communication interface 145, to the parking vehicle 100 indicating the parking request will be ignored if one or both of the processors 170 of the primary parked vehicles 105 determine that the aggregate distance is less than the minimum parking distance data. The processors 170 of one or both primary parked vehicles 105 may be programmed to move their respective vehicles their respective commanded aggregate distance if one or both of the processors 170 of the primary parked vehicles 105 determines that the aggregate distances taken together or separately are equal to or greater than the minimum parking distance data. This may also include commanding the secondary parked vehicles 110 to move their respective supplemental distances 195.

The processor 170 of the primary parked vehicle 105 may be programmed to compare the commanded aggregate distance to the predetermined threshold before moving the commanded aggregate distance. The predetermined threshold, as discussed above, may limit how far the parked vehicle 105, 110 may move during an ignition key-off cycle. The predetermined threshold may be defined as, e.g., a distance value representing a percentage of the commanded aggregate distance, a maximum distance value that the summation of parked vehicles 105, 110 moves from multiple parking requests received during an ignition key-off cycle, etc. The predetermined threshold compared to the aggregate distance may be the same or different from the predetermined threshold, discussed above, compared to the moving distance 135. As such, it is possible that the moving distance 135 may be compared to one predetermined threshold and the aggregate may be compared to a different predetermined threshold, one or both of which must be satisfied before the parking request is executed.

The processor 170 of the primary parked vehicle 105 is further programmed to determine whether the commanded aggregate distance is less than the predetermined threshold. If the commanded aggregate distance is less than the predetermined threshold, the processor 170 of the primary parked vehicle 105 is programmed to command the at least one secondary parked vehicle 110 to move the supplemental distance 195 or a distance less than the supplemental distance 195 (referred to as the "commanded supplemental distance"). Thus, the processor 170 of the primary parked vehicle 105 may be programmed to coordinate the move of the parked vehicles 105, 110. In one instance, the processors 170 of the primary parked vehicles 105 may be programmed to transmit control signals via the communication interface 145 to the vehicle controllers 150 that control one or more vehicle subsystems 155 of the secondary parked vehicles 110 in order to engage the appropriate subsystems to move the secondary parked vehicles 110 their respective commanded supplemental distances. In other instances, the processors 170 of the primary parked vehicles 105 may be programmed to transmit a message to the respective closest secondary parked vehicles 110 commanding the closest secondary parked vehicles 110 to coordinate a move with the next closest secondary parked vehicles 110, and so on. Control signals may be passed to each successive vehicle controller 150 of the secondary parked vehicles 110 in order for the secondary parked vehicles 110 to move their commanded supplemental distance. Following the secondary parked vehicle 110 moves, the processor 170 of the primary parked vehicle 105 may output control signals via the communication bus 165 to the vehicle controller 150 that control the vehicle subsystems 155 of the primary parked vehicle 105 in order to engage the appropriate subsystems to move the primary parked vehicle 105 the commanded moving distance.

Further, if the processor 170 of the primary parked vehicle 105 determines that the commanded aggregate distance is equal to or greater than the predetermined threshold, the processor 170 of the primary parked vehicle 105 may be programmed to command the communication interface 145 to transmit a message to the parking vehicle 100 indicating the parking request is ignored. The processor 170 of the parking vehicle 100 upon receiving the message may be programmed to output the parking request rejected message to the user interface 180 via the communication bus 165.

The processors 170 of the parked vehicles 105, 110 may be programmed to receive the occupant detected signal from the occupant detection system 185 via the respective communication bus 165 indicating that an occupant is in or near the parked vehicles 105, 110. If the processor 170 of the secondary parked vehicle 110 receives the occupant detected signal via the communication bus 165 of the secondary parked vehicle 110, the processor 170 may be programmed to transmit the occupant detected signal to the primary parked vehicle 105 via the communication interface 145. If the processor 170 of the primary parked vehicle 105 receives the occupant detected signal via the communication bus 165 of the primary parked vehicle 105 or from the secondary parked vehicle 110, the processor 170 of the primary parked vehicle 105 may be programmed to command the communication interface 145 to transmit a message to the parking vehicle 100 indicating the parking request is ignored. The processor 170 of the parking vehicle 100 upon receiving the message may be programmed to output the parking request rejected message to the user interface 180 via the communication bus 165.

Figure 3A:
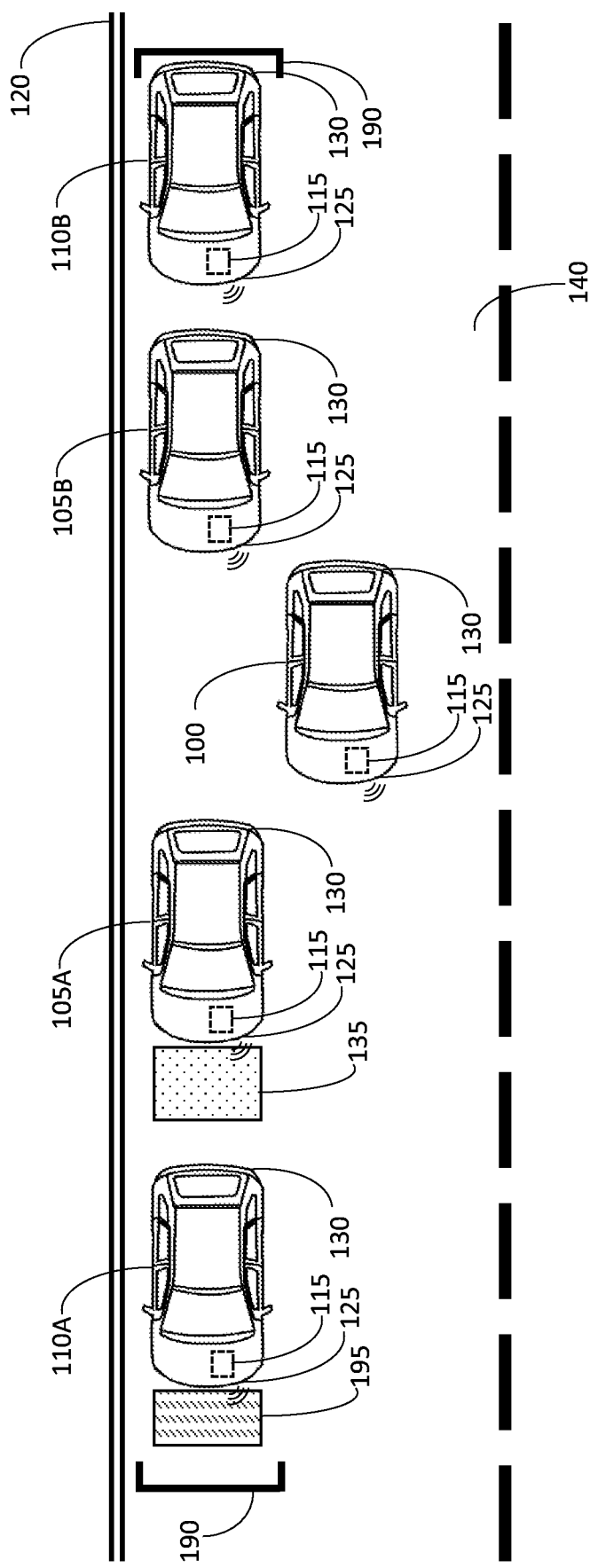
FIGS. 3A-3B illustrate a parking scenario where the parked vehicles receive a parking request for a parking spot from the parking vehicle, and two parked vehicles move to accommodate the parking request.
Figure 3B:
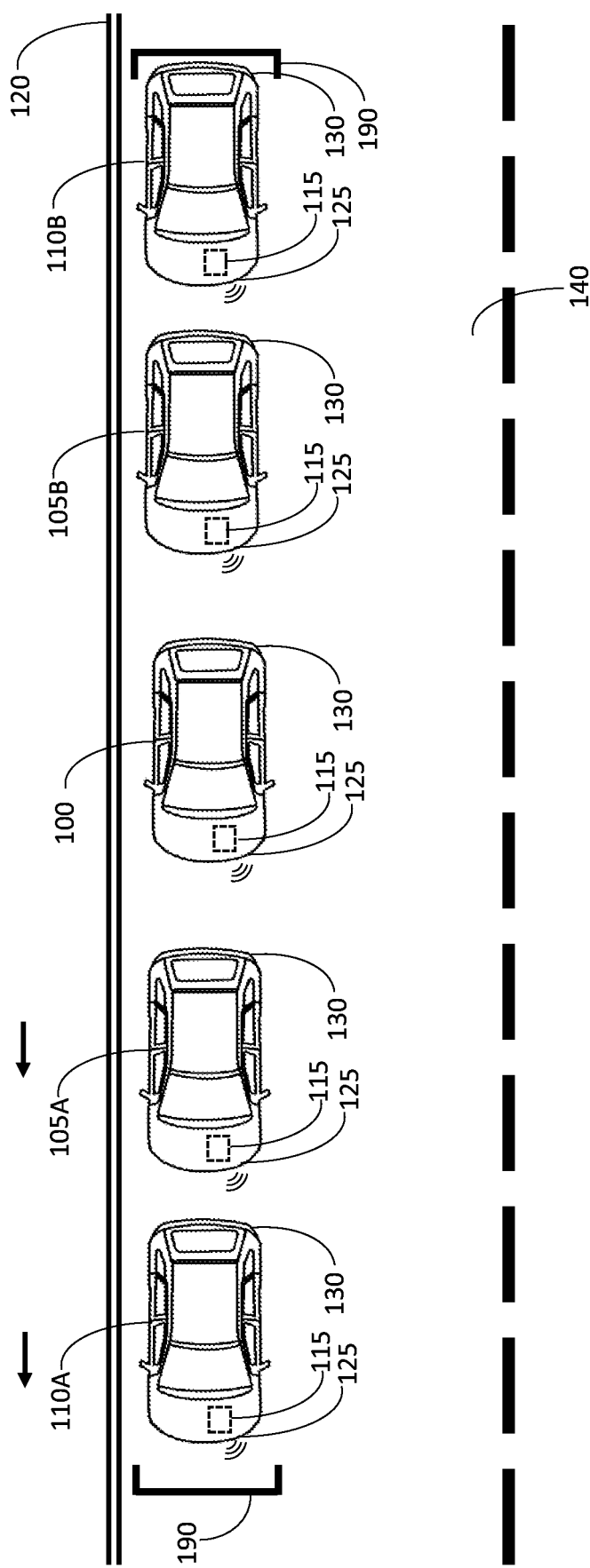

FIGS. 3A-3B illustrate a parking request scenario where the parking vehicle 100 arrives at a parallel parking spot and requests cooperative parking assistance from the parked vehicles 105, 110. The scenario assumes that the parking vehicle 100 has received minimum parking distance data from, e.g., the cooperative park assist system 115 incorporated into the parking vehicle 100.

Referring to FIG. 3A, the parked vehicles 105, 110 are parked on the street 140 in a parallel arrangement along the curb 120, and the parking vehicle 100 sends the parking request to the primary parked vehicles 105. The parking vehicle 100 receives the moving distances 135 from the primary parked vehicles 105 and compares the moving distances 135 to the minimum parking distance data. The parking vehicle 100 determines that the primary parked vehicles 105 are unable to accommodate the required distance for a parallel parking maneuver. Specifically, there is an insufficient amount of moving distance 135 in front of the primary parked vehicle 105A, and only enough space to exit behind the primary parked vehicle 105B, as shown in FIG. 3A. The parking vehicle 100 transmits a message to the primary parked vehicles 105 indicating that the primary parked vehicles 105 query at least one secondary parked vehicle 110 for their respective supplemental distances 195. The primary parked vehicles 105 query the secondary parked vehicles 110 closest to the primary parked vehicles 105 for the supplemental distances 195, and the secondary parked vehicles 110 transmit the supplemental distances 195 to the primary parked vehicles 105. The supplemental distance 195 includes the distance from the secondary parked vehicles 110 to the boundary 190, e.g., a parking lane markers, as shown in FIG. 3A. The primary parked vehicles 105 calculate the aggregate distances based on the moving distance 135 and the supplemental distances 195 and transmit the aggregate distances to the parking vehicle 100. The parking vehicle 100 compares the aggregate distances to the minimum parking distance data, and determines that the aggregate distances are greater than the minimum parking distance data. The parking vehicle 100 transmits the commanded aggregate distance message to the primary parked vehicle 105A and the primary parked vehicle 105A compares the commanded aggregate distances to the predetermined threshold. The primary parked vehicle 105A determines that the commanded aggregate distance is less than the predetermined threshold, which indicates that moving the parked vehicles 105A, 110A will give the parking vehicle 100 sufficient room to park.

Referring to FIG. 3B, the processor 170 of the primary parked vehicle 105A coordinates a forward move of the parked vehicles 105A, 110A, as designated by the arrows. The processor 170 of the primary parked vehicle 105A outputs control signals to the vehicle controller 150 of the secondary parked vehicle 110A via the communication interface 145 to command the subsystems of the secondary parked vehicle 110A to move the commanded supplemental distance. Thereafter, the processor 170 of the primary parked vehicle 105A outputs control signals to the vehicle controller 150 of the same primary parked vehicle 105A via the communication bus 165 to command the subsystems of the primary parked vehicle 105A to move the commanded moving distance. The supplemental distance 195 and the moving distance 135 incorporate enough space for both the secondary parked vehicle 110A and the primary parked vehicle 105A to exit their parking spaces, as shown in FIG.

3B. After the coordinated move, the parking vehicle 100 can be manually or autonomously parked in the parking spot after the parked vehicles 105A, 110A are finished moving.

Figure 4:
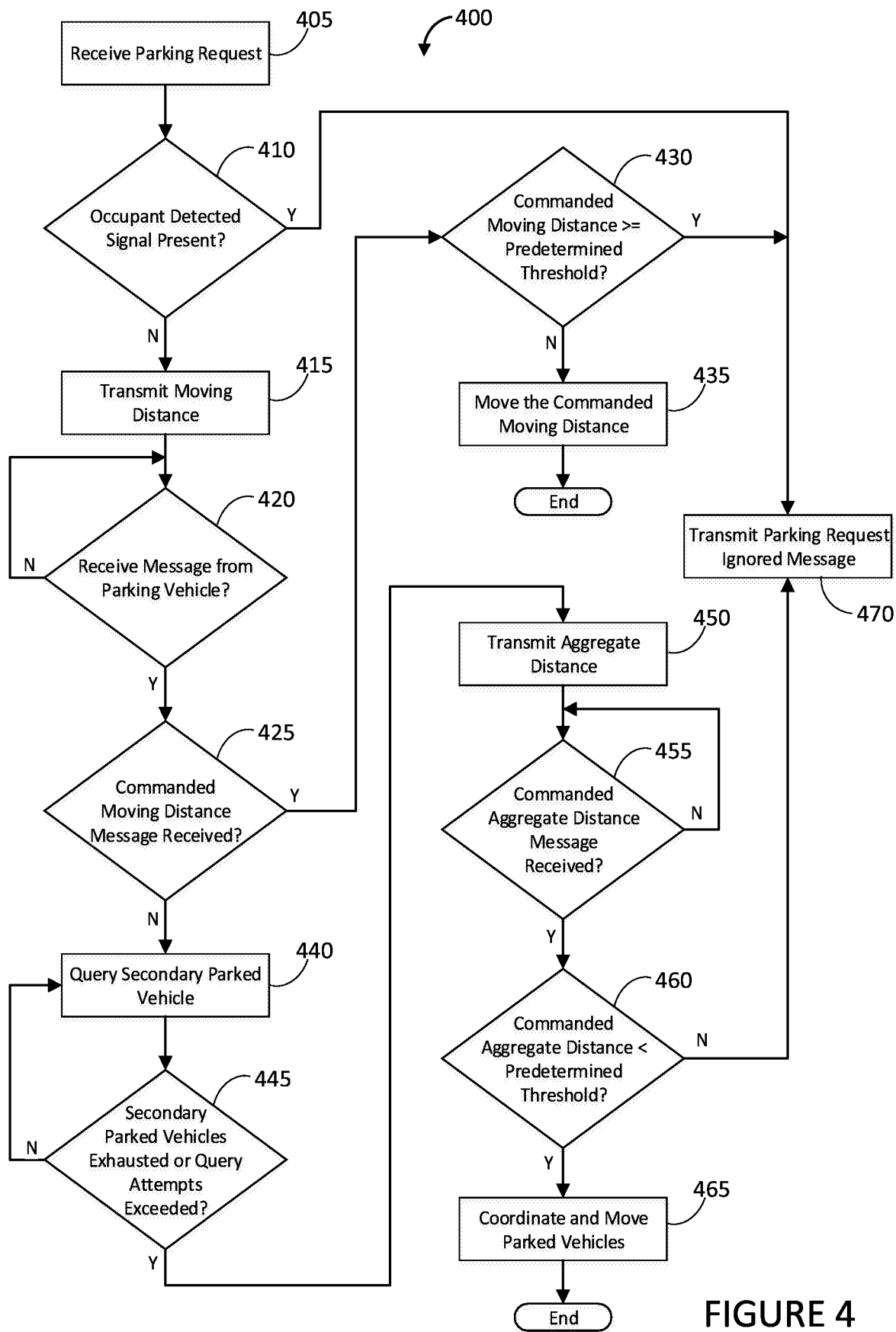
FIG. 4 is a flowchart of an example process that may be executed by the cooperative park assist system of the parked vehicles.

FIG. 4 is a flowchart of an example process 400 that may be implemented by one or more components of the cooperative park assist system 115 for the primary parked vehicle 105. The process 400 may begin when the parking request is transmitted, from the parking vehicle 100 via the communication interface 145, to the primary parked vehicle 105.

At block 405, the cooperative park assist system 115 receives the parking request from the parking vehicle 100. The cooperative park assist system 115 may identify which vehicle is the parking vehicle 100 and which vehicle is the primary parked vehicle 105 based on, e.g., identification signals including unique identifiers of the vehicles received from the parking vehicle 100 and the primary parked vehicle 105 via the communication interface 145. Communication may be established even if one vehicle (i.e., the primary parked vehicle 105) is inactive while the other vehicle (i.e., the parking vehicle 100) is active. In response to the communication interface 145 facilitating a communication pairing between the parking vehicle 100 and the primary parked vehicle 105, the processor 170 of the primary parked vehicle 105 may receive the parking request from the processor 170 of the parking vehicle 100.

At decision block 410, the cooperative park assist system 115 determines whether the occupant detected signal is present. For instance, once paired, the processor 170 of the primary parked vehicle 105 may receive the occupant detected signal from the occupant detection system 185 of the secondary parked vehicle 110 indicating that an occupant is in or near the secondary parked vehicle 110 via the communication interface 145. Further, the processor 170 of the primary parked vehicle 105 may receive the occupant detected signal from the occupant detection system 185 of the primary parked vehicle 105 indicating that an occupant is in or near the primary parked vehicle 105 via the communication bus 165. If the processors 170 of parked vehicles 105, 110 receive the occupant detected signal, the process 400 may proceed to block 470. Otherwise, the process 400 may proceed to block 415.

At block 415, the cooperative park assist system 115 determines the moving distance 135 the primary parked vehicle 105 may move. The processor 170 of the primary parked vehicle 105 may both activate the position sensor 160 and receive the distance signal output from the position sensor 160 via the communication bus 165. The processor 170 of the primary parked vehicle 105 calculates the moving distance 135, which includes the distance signal and the amount of space the primary parked vehicle 105 requires to exit its own parking space. The processor 170 may transmit the moving distance 135 to the processor 170 of the parking vehicle 100 via the communication interface 145.

At decision block 420, the cooperative park assist system 115 determines whether the primary parked vehicle 105 has received either the commanded moving distance message or a message commanding the primary parked vehicle 105 to the query at least one secondary parked vehicle 110 for the supplemental distance 195. The processor 170 of the primary parked vehicle 105 waits to receive either the commanded move distance message or a command to query at least one secondary parked vehicle 110 for its supplemental distance 195 from the processor 170 of the parking vehicle 100 via the communication interface 145. If either message has not been received by the processor 170 of the primary parked vehicle 105, the process 400 may continue to execute block 420 until one of the messages are received. Otherwise, the process 400 proceeds to block 425.

At decision block 425, the cooperative park assist system 115 determines if the commanded moving distance message has been received. The processor 170 of the primary parked vehicle 105 monitors the output of the communication interface 145 and determines, based on the output of the communication interface 145, whether the commanded moving distance message has been received. If the processor 170 of the primary parked vehicle 105 receives the commanded moving distance message, the process 400 proceeds to block 430. Otherwise, the processor 170 may determine that the command to query at least one secondary parked vehicle 110 for the supplemental distance 195 message has been received. In this instance, the process 400 proceeds to block 440.

At decision block 430, the cooperative park assist system 115 compares the respective commanded moving distance to the predetermined threshold. Once the processor 170 of the primary parked vehicle 105 receives the message indicating that the primary parked vehicle 105 moves the commanded moving distance, the processor 170 of the primary parked vehicle 105 compares the respective commanded moving distance to the predetermined threshold. If the commanded moving distance is equal to or greater than the predetermined threshold, the process 400 proceeds to block 470. Otherwise, the process 400 proceeds to block 435.

At block 435, the cooperative park assist system 115 commands the primary parked vehicle 105 to move the respective commanded moving distance. Commanding the primary parked vehicle 105 to move the commanded moving distance may include the processor 170 of the primary parked vehicle 105 transmitting control signals, via the communication bus 165, to the vehicle controller 150. The vehicle controller 150 may output control signals to various actuators that cause the primary parked vehicle 105 to move the commanded moving distance. The process 400 ends after commanding the primary parked vehicle 105 to move the respective commanded moving distance. In some instances, rather than end, after block 435, the processor 170 may wait for a subsequent parking request received via the communication interface 145. When received, the process 400 may begin again at block 405.

At block 440, the cooperative park assist system 115 queries at least one secondary parked vehicle 110 for the supplemental distance 195 the secondary parked vehicle 110 may move. In one instance, the processor 170 of the primary parked vehicle 105 may command the communication interface 145 to query the secondary parked vehicle 110 for the supplemental distance 195 the secondary parked vehicle 110 may move. In response to the query, the processor 170 of the secondary parked vehicle 110 calculates the supplemental distance 195 and transmits the supplemental distance 195 to the processor 170 of the primary parked vehicle 105 via the communication interface 145. In other instances, e.g., when block 445 determines that another query of a secondary parked vehicle 110 is needed, the processor 170 of the primary parked vehicle 105 transmits a message to another secondary parked vehicle 110, beginning with, e.g., the secondary parked vehicle 110 closest to the secondary parked vehicle 110 from a previous iteration of block 440, requesting that the other secondary parked vehicle 110 query its closest secondary parked vehicle 110 in a direction away from the parked vehicle 105, 110 for the supplemental distance 195 of that secondary parked vehicle 110. In yet another instance, the processor 170 of the primary parked vehicle 105 may query any parked vehicle 110 for the supplemental distance 195 regardless of the relative position of the parked vehicle 110. Every supplemental distance 195 received may be stored in the memory 175 of the primary parked vehicle 105.

At decision block 445, the cooperative park assist system 115 determines if the number of secondary parked vehicles 110 have been exhausted or the query attempts have been exceeded. In some instances, if the processor 170 of the primary parked vehicle 105 can no longer pair with another secondary parked vehicle 110, or if the host vehicle 105 determines that the query attempts exceed the maximum query value, the process 400 proceeds to block 450. In other instances, if processor 170 of the primary parked vehicle 105 determines that the supplemental distance 195 or the accumulated supplemental distances 195, i.e., supplemental distances 195 obtained from additional queries, received by the processor 170 of primary parked vehicle 105 are equal to or greater than the secondary distance value needed to accommodate the parallel parking maneuver, the process 400 proceeds to block 450. In yet another instance, the processor 170 of the secondary parked vehicle 110 may determine that the boundary 190 is, e.g., a fire hydrant, a curb, an intersection, etc., and the secondary parked vehicle 110 may block this boundary 190 if it were to move. In this case, the processor 170 of the secondary parked vehicle 110 may decline the request for its supplemental distance 195 and command the communication interface 145 to transmit a message to the primary parked vehicle 105 or parked vehicle 105, 110 that sent the request indicating that it cannot accommodate any requests to move. In response to the message, the processor 170 of the primary parked vehicle 105 may discontinue the queries and the process 400 proceeds to block 450. Otherwise, the process 400 proceeds to block 440 so that the processor 170 of the primary parked vehicle 105 can query another secondary parked vehicle 110.

At block 450, the cooperative park assist system 115 calculates the aggregate distance and transmits the aggregate distance to the parking vehicle 100. The processor 170 of the primary parked vehicle 105 calculates the aggregate distance, which is based on the moving distance 135 calculated in block 415 and the supplemental distances 195 accumulated in block 440. The processor 170 of the primary parked vehicle 105 may transmit the aggregate distance to the processor 170 of the parking vehicle 100 via the communication interface 145.

At decision block 455, the cooperative park assist system 115 determines whether the primary parked vehicle 105 has received the commanded aggregate distance message. The processor 170 of the primary parked vehicle 105 waits to receive the commanded aggregate distance message from the processor 170 of the parking vehicle 100 via the communication interface 145. If the message has not been received by the processor 170 of the primary parked vehicle 105, the process 400 may continue to execute block 455 until the message is received. Otherwise, the process 400 proceeds to block 460.

At decision block 460, the cooperative park assist system 115 determines if the commanded aggregate distance is less than the predetermined threshold. The processor 170 of the primary parked vehicle 105 compares the commanded aggregate distance to the predetermined threshold. If the processor 170 of the primary parked vehicle 105 determines that the commanded aggregate distance is less than the predetermined threshold, the process 400 proceeds to block 465. Otherwise, the process 400 proceeds to block 470.

At block 465, the cooperative park assist system 115 coordinates the move of the parked vehicles 105, 110. In some instances, the processor 170 of the primary parked vehicle 105 may transmit control signals, via the communication interface 145, to the vehicle controllers 150 that control one or more vehicle subsystems 155 of the secondary parked vehicles 110 to engage the appropriate subsystems to move the secondary parked vehicles 110 their respective commanded supplemental distances. In other instances, the processor 170 of the primary parked vehicle 105 may transmit a message to the closest secondary parked vehicle 110 commanding the closest secondary parked vehicle 110 to coordinate a move with the next closest secondary parked vehicle 110, and so on. Control signals may be passed to each successive vehicle controller 150 of the secondary parked vehicle 110 in order for the secondary parked vehicles 110 to move their commanded supplemental distances. Following the secondary parked vehicle 110 moves, the processor 170 of the primary parked vehicle 105 may output control signals via the communication bus 165 to the vehicle controller 150 that control the vehicle subsystems 155 of the primary parked vehicle 105 in order to engage the appropriate subsystems to move the primary parked vehicle 105 the commanded moving distance. The process 400 ends after the coordinated move of the parked vehicles 105, 110. In some instances, rather than end, after block 465, the processor 170 may wait for a subsequent parking request received via the communication interface 145. When received, the process 400 may begin again at block 405.

At decision block 470, the cooperative park assist system 115 ignores the parking request because the cooperative park assist system 115 either received an occupant detected signal or the predetermined threshold was exceeded. The processor 170 of the primary parked vehicle 105 may command the communication interface 145 to transmit the parking request ignored message to the parking vehicle 100 indicating the parking request is ignored. The processor 170 may wait for a subsequent parking request received via the communication interface 145. When received, the process 400 may begin again at block 405.

Figure 5:
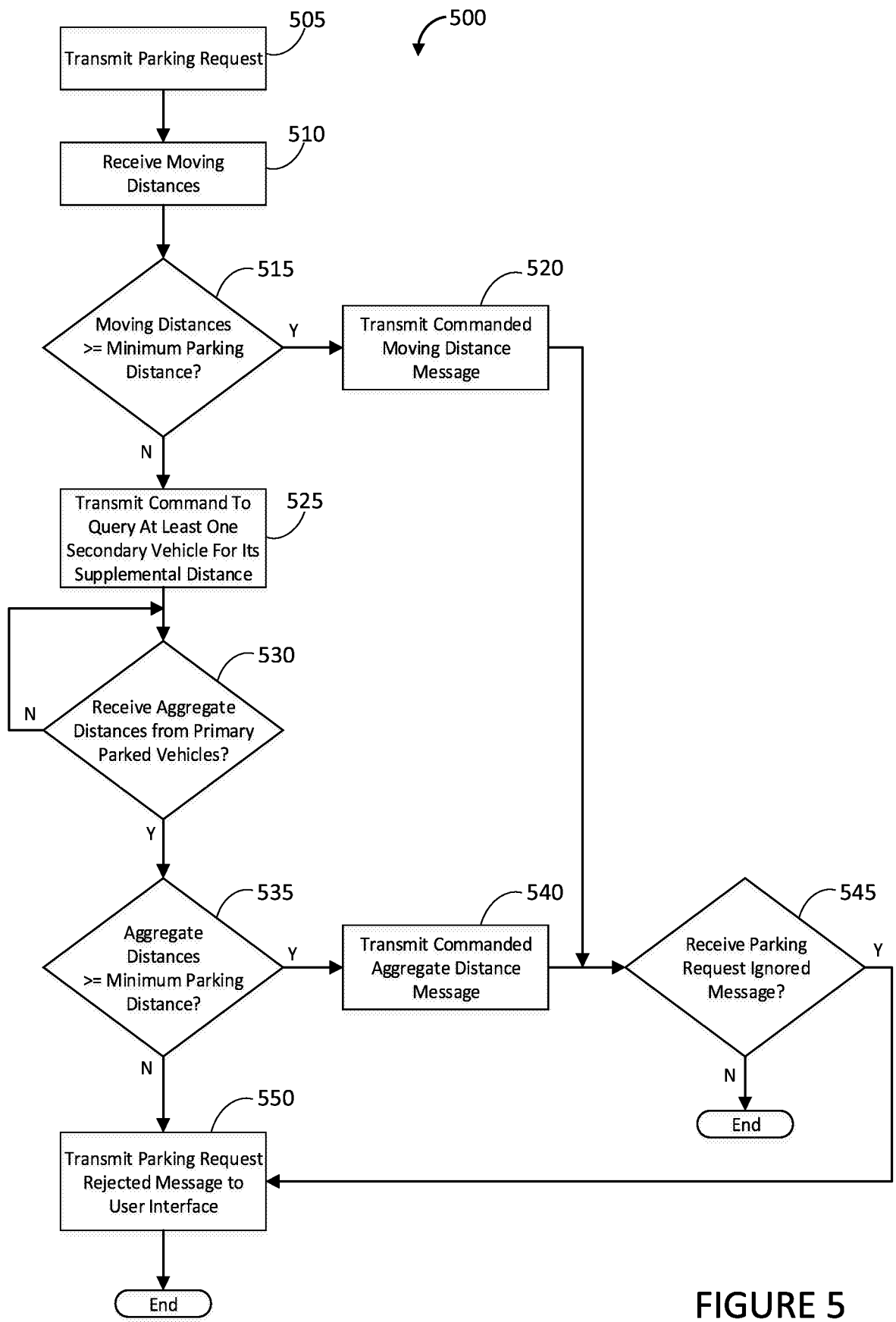
FIG. 5 is a flowchart of an example process that may be executed by the cooperative park assist system of the parking vehicle.

FIG. 5 is a flowchart of an example process 500 that may be implemented by one or more components of the cooperative park assist system 115 for the parking vehicle 100. The process 500 may begin when the driver engages the cooperative park assist system 115 via the user interface 180 in the parking vehicle 100. In this case, the cooperative park assist system 115 receives the minimum parking distance data, which represents the amount of space needed for a parallel parking maneuver, from a separate system, e.g., a park assist system capable of autonomous parallel parking of the parking vehicle 100.

At block 505, the cooperative park assist system 115 transmits the parking request to the primary parked vehicles 105. The processor 170 of the parking vehicle 100 initiates the communication with the processors 170 of the primary parked vehicles 105 via the communication interface 145. Moreover, the cooperative park assist system 115 may identify which vehicle is the parking vehicle 100 and which vehicles are the primary parked vehicles 105 based on, e.g., identification signals including unique identifiers of the vehicles received from the parking vehicle 100 and the primary parked vehicles 105 via the communication interface 145. Communication may be established even if one vehicle (i.e., the primary parked vehicle 105) is inactive while the other vehicle (i.e., the parking vehicle 100) is active. In response to the communication interface 145 facilitating a communication pairing between the parking vehicle 100 and the primary parked vehicles 105, the processor 170 of the parking vehicle 100 may command the communication interface 145 to transmit the parking request to the processors 170 of the primary parked vehicles 105.

At block 510, the cooperative park assist system 115 receives the moving distances 135. The processor 170 of the parking vehicle 100 receives the moving distances 135 from the processors 170 of the primary parked vehicles 105 via the communication interface 145. The moving distances 135 represents the distances the primary parked vehicles 105 may move. In one instance, the processor 170 of the parking vehicle 100 may not receive any moving distances 135 from the primary parked vehicles 105, e.g., the primary parked vehicles 105 ignore the parking request, or are unable to respond. In this case, the process 500 may proceed to block 550 after an appropriate time-out period as determined by the processor 170 of the parking vehicle 100, e.g., 1-5 seconds. Alternatively, the processor 170 of the parking vehicle 100 may receive from one or both of the primary parked vehicles 105 a message indicating that the primary parked vehicles 105 refuse to move. In this case, the processor 170 of the parking vehicle 100 may treat this as a "0" moving distance 135 and the process 500 proceeds to block 515. In other instances, if the processor 170 of the parking vehicle 100 receives the message indicating that the primary parked vehicles 105 refuse to move, the process 500 may proceed to block 550.

At decision block 515, the cooperative park assist system 115 determines if the moving distances 135 are equal to or greater than the minimum parking distance data. The processor 170 of the parking vehicle 100 may receive the moving distances 135 from one or both of the primary parked vehicles 105 and determine if one or both of the primary parked vehicles 105 may accommodate a parallel parking maneuver by comparing the moving distances 135 to the minimum parking distance data. Once paired, the processor 170 of the parking vehicle 100 may determine which moving distance 135 corresponds to which primary parked vehicle 105A, 105B, as set forth above. In some instances, the processor 170 of the parking vehicle 100 may determine that the moving distance 135 of one of the primary parked vehicles 105 is equal to or greater than the minimum parking distance data. In this case, the processor 170 of the parking vehicle 100 commands the communication interface 145 to transmits a message to the primary parked vehicle 105 indicating that the primary parked vehicle 105 move the commanded moving distance, and the process 500 proceeds to block 520. In some instances, the processor 170 of the parking vehicle 100 determines that the moving distances 135 of both the primary parked vehicles 105, taken together, are equal to or greater than the minimum parking distance data. In this case, the processor 170 of the parking vehicle 100 commands the communication interface 145 to transmit a message to both of the primary parked vehicles 105 indicating that the primary parked vehicles 105 move their respective commanded moving distance, and the process 500 proceeds to block 520. Otherwise, the primary parked vehicles 105 are not able to accommodate the parallel parking maneuver and the process 500 proceeds to block 525.

At block 520, the cooperative park assist system 115 transmits the commanded moving distance message. The processor 170 of the parking vehicle 100 may command the communication interface 145 to transmit a message to one or both of the primary parked vehicles 105 indicating that one or both of the primary parked vehicles 105 move their respective commanded moving distance.

At block 525, the cooperative park assist system 115 transmits the command to query at least one secondary parked vehicle 110 for its supplemental distance 195. The processor 170 of the parking vehicle 100 commands the communication interface 145 to transmit a message to the primary parked vehicles 105 commanding the primary parked vehicles 105 to query at least one secondary parked vehicle 110 for its respective supplemental distance 195.

At block 530, the cooperative park assist system 115 determines whether the parking vehicle 100 has received the aggregate distances from one or both of the primary parked vehicles 105. The processor 170 of the parking vehicle 100 waits to receive the aggregate distances from the processors 170 of the primary parked vehicles 105 via the communication interfaces 145. If the aggregate distances have not been received by the processor 170 of the parking vehicle 100, the process 500 may continue to execute block 530 until the aggregate distances are received. Otherwise, the process 500 proceeds to block 535.

At decision block 535, the cooperative park assist system 115 determines if the aggregate distances are equal to or greater than the minimum parking distance data. If processor 170 of the parking vehicle 100 determines that the aggregate distances from the processors 170 of the primary parked vehicles 105 taken together or separately are equal to or greater than the minimum parking distance data, the process 500 proceeds to block 540. Otherwise, the cooperative park assist system 115 is unable to accommodate the parallel parking maneuver and the process 500 proceeds to block 550.

At block 540, the cooperative park assist system 115 transmits the commanded aggregate distance message. The processor 170 of the parking vehicle 100 may calculate the commanded aggregate distance, and the processor 170 may command the communication interface 145 to transmit a message to the communication interfaces 145 of one or both of the primary parked vehicles 105 commanding the parked vehicles 105, 110, including the primary parked vehicles 105 and the secondary parked vehicles 110, to move their respective commanded aggregated distance.

At decision block 545, the cooperative park assist system 115 determines if the parking vehicle 100 has received the parking request ignored message. The processor 170 of the parking vehicle 100 determines whether the parking request ignored message was received from either of the processors 170 of primary parked vehicles 105 via the communication interface 145. If the processors 170 of the primary parked vehicles 105 determine that the predetermined threshold has been exceeded or the occupant detected signal is present, the processor 170 of the parking vehicle 100 may receive the parking request ignored message from the processors 170 of the primary parked vehicles 105 and the process 500 proceeds to block 550. Otherwise the process 500 ends.

At block 550, the cooperative park assist system 115 outputs the parking request rejected message. Once the processor 170 of the parking vehicle 100 receives the parking request ignored message from the processor 170 of the primary parked vehicle 105, the processor 170 of the parking vehicle 100 outputs the parking request rejected message to the user interface 180 via the communication bus 165. Thereafter, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:
1. A vehicle system comprising:
    a position sensor programmed to output a distance signal representing a distance of a first parked vehicle to a boundary; and a processor of the first vehicle that is parked, the processor programmed to:
receive a parking request from a second vehicle that is parking to determine a moving distance based at least in part on the distance to the boundary and an amount of space for the first vehicle to exit a parking space;
transmit the moving distance from the first vehicle to the parking vehicle;
receive an occupant detected signal output by an occupant detection system in the first vehicle indicating an occupant in the first vehicle; and
ignore the parking request from the second vehicle that is parking after receiving the occupant detected signal output by the occupant detection system in the first vehicle.

2. The vehicle system of claim 1, wherein the processor is programmed to compare the moving distance to a predetermined threshold.

3. The vehicle system of claim 2, wherein the processor is programmed to determine that the moving distance is equal to or greater than the predetermined threshold and ignore the parking request after determining that the moving distance is equal to or greater than the predetermined threshold.

4. The vehicle system of claim 2, wherein the processor is programmed to determine that the moving distance is less than the predetermined threshold and command a vehicle controller of the primary parked vehicle to move the moving distance after determining that the moving distance is less than the predetermined threshold.

5. The vehicle system of claim 1, wherein the processor is programmed to command a communication interface to query at least one secondary parked vehicle for a supplemental distance of the at least one secondary parked vehicle.

6. The vehicle system of claim 5, wherein the processor is programmed to calculate an aggregate distance based on the moving distance and the supplemental distance.

7. The vehicle system of claim 6, wherein the processor is programmed to compare the aggregate distance to a predetermined threshold, determine that the aggregate distance is less than the predetermined threshold, and command the at least one secondary parked vehicle to move the supplemental distance after determining that the aggregate distance is less than the predetermined threshold.

8. The vehicle system of claim 7, wherein the predetermined threshold is a total distance that the vehicle can move during a key-off cycle.

9. A method comprising:
receiving a parking request from a second vehicle that is parking;
receiving a distance signal representing a distance to a boundary of a first vehicle that is parked;
determining a moving distance based at least in part on the distance to the boundary and an amount of space for the first vehicle to exit a parking space;
transmitting the moving distance from the first vehicle to the parking vehicle;
detecting an occupant in the first vehicle based at least in part on a signal output by an occupant detection system; and
ignoring the parking request from the second vehicle that is parking after detecting the occupant in the first vehicle.

10. The method of claim 9, further comprising querying at least one secondary parked vehicle for a supplemental distance of the at least one secondary parked vehicle.

11. The method of claim 10, further comprising calculating an aggregate distance based on the moving distance and the supplemental distance.

12. The method of claim 11, further comprising:
comparing the aggregate distance to a predetermined threshold;
determining that the aggregate distance is less than the predetermined threshold; and
commanding the at least one secondary parked vehicle to move the supplemental distance after determining that the aggregate distance is less than the predetermined threshold.

13. The method of claim 12, wherein the predetermined threshold is a total distance that the vehicle can move during a key-off cycle.

14. The method of claim 9, further comprising:
comparing the moving distance to a predetermined threshold;
autonomously operating the primary parked vehicle to move the parking distance as a result of determining that the moving distance is less than the predetermined threshold, and
ignoring the parking result as a result of determining that the moving distance is equal to or greater than the predetermined threshold.

* * * * *